No. 822,232. PATENTED JUNE 5, 1906.
J. H. ALEXANDER.
HAME FASTENER.
APPLICATION FILED SEPT. 25, 1905.

Inventor
J. H. Alexander

UNITED STATES PATENT OFFICE.

JAMES HENRY ALEXANDER, OF FULWOOD, ARKANSAS.

HAME-FASTENER.

No. 822,232.     Specification of Letters Patent.     Patented June 5, 1906.

Application filed September 25, 1905. Serial No. 279,955.

*To all whom it may concern:*

Be it known that I, JAMES HENRY ALEXANDER, a citizen of the United States, residing at Fulwood, in the county of St. Francis and State of Arkansas, have invented certain new and useful Improvements in Hame-Fasteners, of which the following is a specification.

For a full description of the invention and the merits thereof and also to acquire a knowledge of the details of construction of the means for effecting the result reference is to be had to the following description and accompanying drawings, in which—

Figure 1:
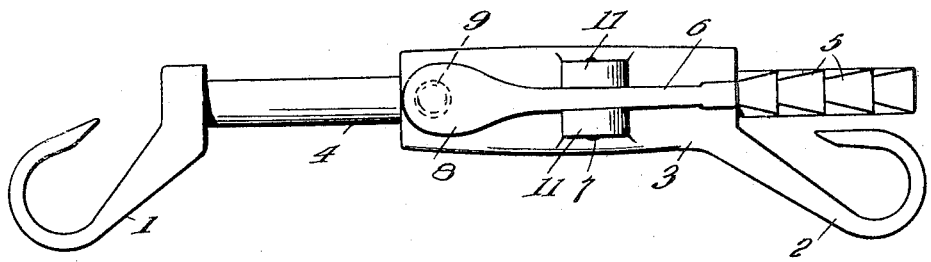
Figure 2:
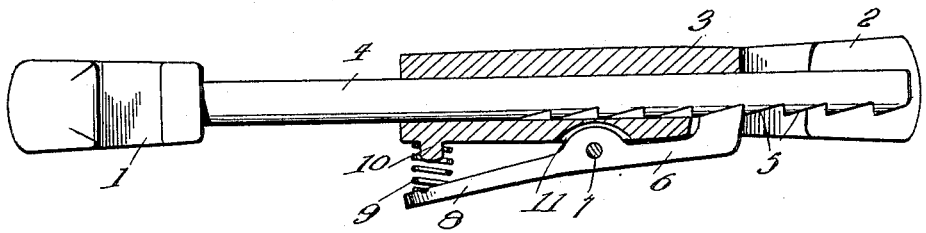
Figure 3:
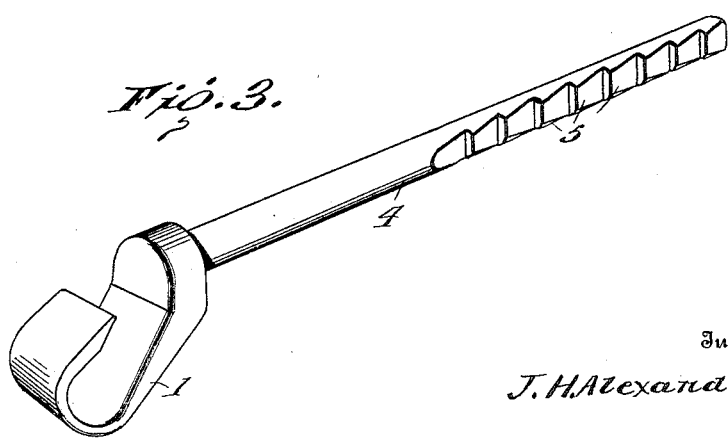

Figure 1 is a side elevation showing a hame-fastener embodying the invention. Fig. 2 is a longitudinal sectional view. Fig. 3 is a detail perspective view of the relatively movable hook.

Corresponding and like parts are referred to in the following description and indicated in all the views of the drawings by the same reference characters.

This invention embodies improvements in hame-fasteners of the type comprising two hooks and a ratchet-dog mounted to adjustably connect the hooks. For the purposes of this description the hook 1 will be designated as relatively movable, while the hook 2 is relatively fixed. The hook 2 extends at an angle from its shank 3, which shank is of tubular formation, so as to receive the shank 4 of the hook 1, the latter hook extending also at an angle from its shank. While the shank 3 is of tubular formation, the shank 4 is solid and virtually consists of a stem adapted to pass through the shank 3, being mounted therein when the two hooks 1 and 2 are connected in operative relation. The shank 4 of the hook 1 is provided with a plurality of teeth 5 longitudinally thereof, said teeth forming shoulders at intervals and being adapted to be engaged by one end of the catch 6, applied to the shank 3 of the hook 2. The catch 6 comprises a dog pivoted between its ends, as shown at 7, the end of the catch opposite that engaging the shank 4 being widened to form a finger-piece 8, between which and the adjacent side portion of the shank 3 is interposed a spring 9, a short lug 10 projecting outwardly from the shank 3, so as to prevent displacement of the spring 9, which is of the coil type. The catch 6 is pivoted to spaced lugs 11, integrally formed with the shank 3 or hook 2. The catch 6 is arranged at one side of the shank 3 and in this position is not liable to be broken off by branches of trees or the like under which the animal to which the fastener is secured may pass. Further, the arrangement of the catch is such that the same is not likely to receive foreign matter, which would interfere with the proper working thereof under actual conditions of service.

The arrangement of the hooks 1 and 2 with respect to their shanks 4 and 3, respectively, is peculiar in that the shanks are adapted to be arranged in alinement and when the hooks are connected the shank 4 will project across the mouth of the hook 2 and virtually form a mousing therefor. By so doing the shank 4 will prevent accidental disconnection of the hook 2 from the hame should the latter become loose in any way.

The device is simple and adapted to be worked readily under all conditions of service. The fastener is also inexpensive from the standpoint of manufacture, and the arrangement of the hooks thereof with reference to the shanks is such that the hooks will snugly fit about the collar. Attention is also directed to the fact that the strain is not concentrated upon the catch 6, but is equally distributed throughout the hook 3, thereby greatly increasing the durability of the device.

Having thus described the invention, what is claimed as new is—

In a hame-fastener, the combination of two hooks, one of said hooks being provided with a tubular shank and extending at an angle thereto, the other of said hooks being formed with a shank received in the tubular shank of the first-mentioned hook and projecting across the mouth of the first-mentioned hook to form a mousing therefor, the shank of the second hook being formed longitudinally thereof with shoulders at intervals, and a catch carried by the tubular shank aforesaid and adapted to engage the shoulders on the shank of the second hook to connect the two hooks together.

In testimony whereof I affix my signature in presence of two witnesses.

JAMES HENRY ALEXANDER. [L. S.]

Witnesses:
    DENNIS DOWNEY,
    O. J. GOOD.